United States Patent [19]

Ohtaka et al.

[11] Patent Number: 5,372,112
[45] Date of Patent: Dec. 13, 1994

[54] DEVICE FOR CONTROLLING A MULTI-CYLINDER ENGINE

[75] Inventors: Yukio Ohtaka, Susono; Kazuhiro Sakurai, Gotenba; Yutaka Obuchi; Shigetaka Tanaka, both of Susono; Takashi Mori, Toyohashi, all of Japan

[73] Assignees: Toyota Jidosha Kabushiki Kaisha, Toyota; Nippondenso Co. Ltd., Kariya, both of Japan

[21] Appl. No.: 51,115

[22] Filed: Apr. 21, 1993

[30] Foreign Application Priority Data

Jun. 9, 1992 [JP] Japan .................. 4-149487

[51] Int. Cl.⁵ ............................................. F02P 5/00
[52] U.S. Cl. ............................................. 123/17
[58] Field of Search ............... 123/417, 416, 479, 480, 123/488, 494; 364/431.11, 431.05, 431.04

[56] References Cited

U.S. PATENT DOCUMENTS

| | | | |
|---|---|---|---|
| 4,403,584 | 9/1983 | Suzuki et al. | 364/431.05 |
| 4,485,784 | 12/1984 | Fujii et al. | 123/416 |
| 4,489,689 | 12/1984 | Avian et al. | 123/417 |
| 4,762,105 | 8/1988 | Beyer et al. | 123/417 |
| 5,267,542 | 12/1993 | Keskula | 123/417 |

FOREIGN PATENT DOCUMENTS

| | | | |
|---|---|---|---|
| 60-22202 | 2/1985 | Japan | 123/417 |
| 60-132041 | 7/1985 | Japan | 123/417 |
| 60-135332 | 7/1985 | Japan | 123/417 |
| 60-244650 | 12/1985 | Japan | 123/417 |
| 61-49154 | 3/1986 | Japan | 123/417 |
| 2115552 | 4/1990 | Japan | 123/417 |
| 2176141 | 7/1990 | Japan | 123/417 |

*Primary Examiner*—Raymond A. Nelli
*Attorney, Agent, or Firm*—Kenyon & Keynon

[57] ABSTRACT

An engine including at least two digital computers wherein controlled systems each including a switching unit, an ignitor, and a spark plug are independently provided for each cylinder, and controlled systems each including a switching unit, a drive circuit, and a fuel injector are independently provided for each cylinder. The controlled systems are normally controlled by one of the digital computers, but when one of the digital computers malfunctions, the controlled systems are controlled by the other digital computer.

14 Claims, 8 Drawing Sheets

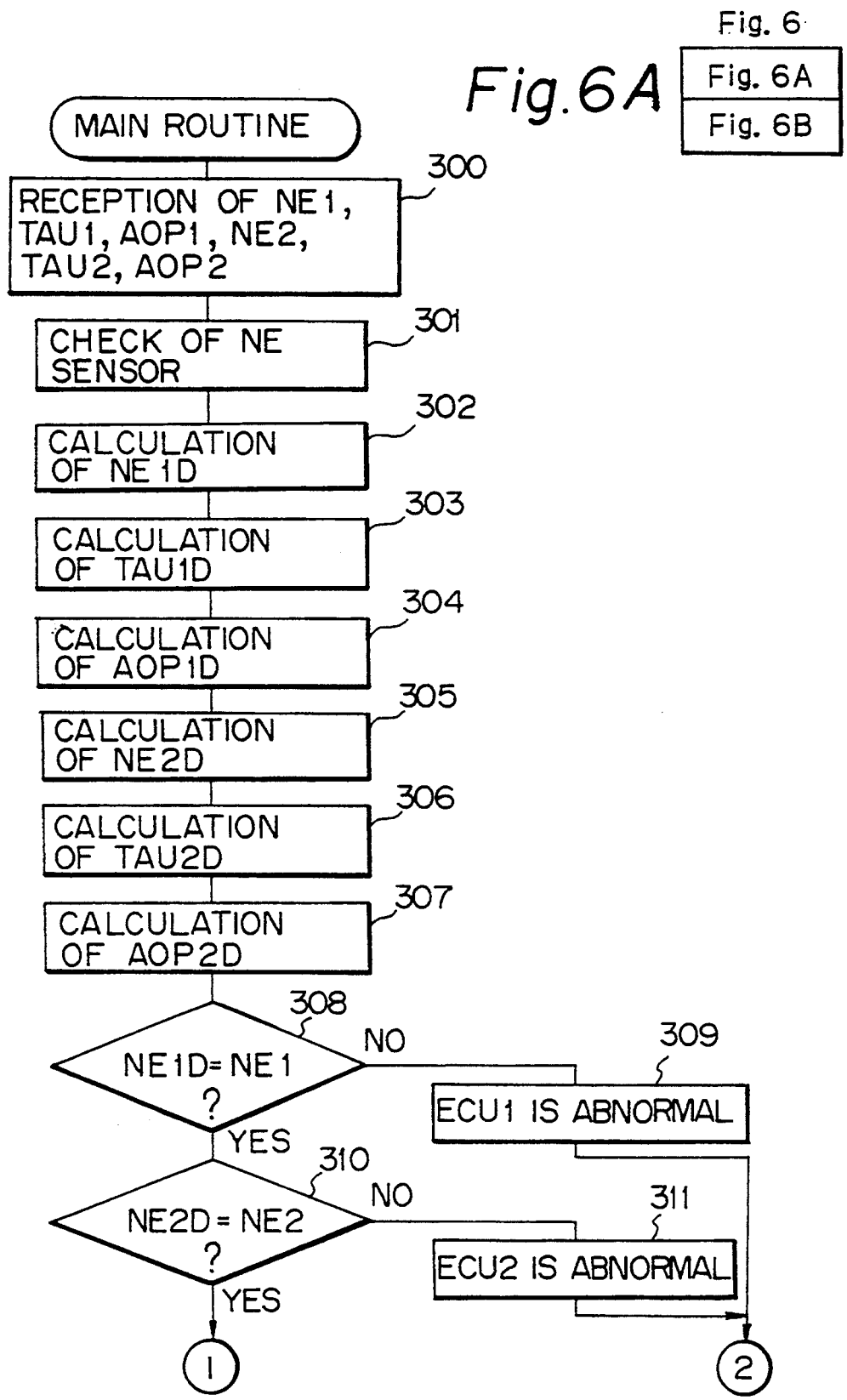

DEVICE FOR CONTROLLING A MULTI-CYLINDER ENGINE

BACKGROUND OF THE INVENTION

1. Field of the Invention

The present invention relates to a device for controlling a multi-cylinder engine.

2. Description of the Related Art

There is known an internal combustion engine wherein the fuel injection system, the ignition system, the idling speed control system, and other systems are controlled based on the outputs of a pair of digital computers and provision is made of switching means for selectively inputting the outputs of the digital computers to the controlled systems (see Japanese Unexamined Patent Publication (Kokai) No. 61-49154). In this internal combustion engine, when the pair of digital computers are operating normally, the fuel injection system and the ignition system are controlled based on the output of one of the digital computers and the idling speed control system etc. are controlled based on the output of the other digital computer. When an abnormality occurs in one digital computer, all the systems are controlled by the other normally operating digital computer. In this way, even if an abnormality occurs in one digital computer, it is still possible to control the systems due to the provision of multiple digital computers.

In such an internal combustion engine, however, there is the problem that multiple controlled systems are themselves not provided, so when a controlled system malfunctions, the fuel injection for all the cylinders becomes impossible or the ignition of all the cylinders becomes impossible, so the engine cannot be operated.

SUMMARY OF THE INVENTION

An object of the present invention is to provide an engine control device capable of continuing to operate the engine even if one of the digital computers or one of the controlled systems malfunctions.

According to the present invention, there is provided a device for controlling an engine having a plurality of cylinders, the device comprising at least two digital computers; a plurality of controlled systems each being independently provided for the corresponding cylinder, each control system being controlled by the output of one of the digital computers and controlling the corresponding cylinder; and a plurality of switching means each being provided for the corresponding controlled system for selectively inputting the output of one of the digital computers into each controlled system to control the corresponding cylinder.

The present invention may be more fully understood from the description of a preferred embodiment of the invention set forth below, together with the accompanying drawings.

BRIEF DESCRIPTION OF THE DRAWINGS

In the drawings,

FIGS. 6, 6A and 6B are flow charts of the routine executed in the digital computer DECU.

DESCRIPTION OF THE PREFERRED EMBODIMENT

Figure 1:
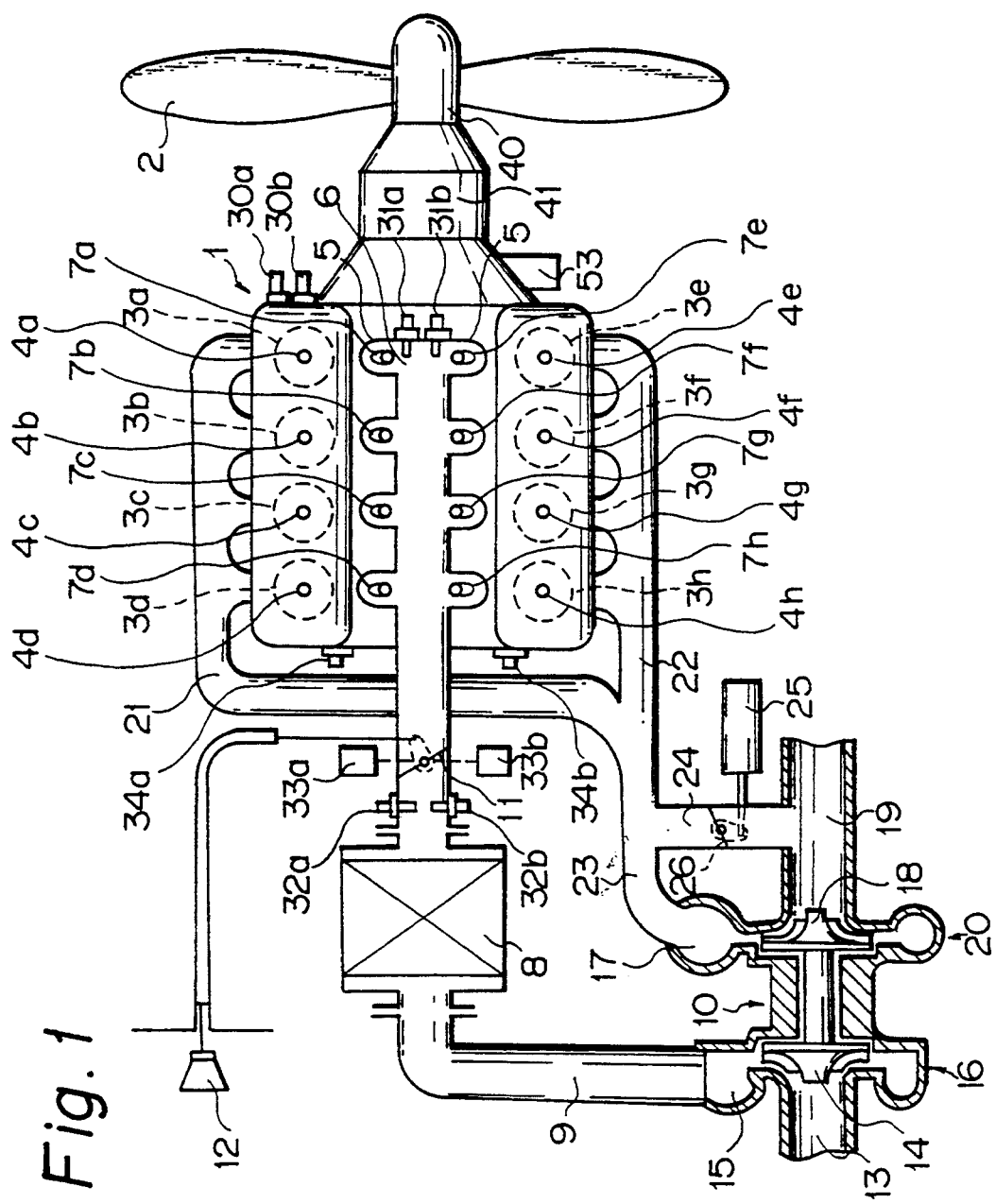
FIG. 1 is a plane view of an internal combustion engine.

FIG. 1 shows a reciprocating internal combustion engine 1 for driving a propeller. In the embodiment shown in FIG. 1, the internal combustion engine 1 is comprised of a spark ignition type 8-cylinder V-type internal combustion engine where the cylinders $3a$, $3b$, $3c$, $3d$, $3e$, $3f$, $3g$, and $3h$ are respectively provided with single spark plugs $4a$, $4b$, $4c$, $4d$, $4e$, $4f$, $4g$, and $4h$. Further, the cylinders $3a$ to $3h$ are connected to a common intake duct 6 through corresponding intake branch pipes 5. In the intake branch pipes 5 are arranged the fuel injectors $7a$, $7b$, $7c$, $7d$, $7e$, $7f$, $7g$, and $7h$. The intake duct 6 is connected to an exhaust turbocharger 10 through an intercooler 8 and an intake duct 9. In the intake duct 6 downstream of the intercooler 8 is disposed a throttle valve 11. The throttle valve 11 is connected to a throttle lever 12 provided at the pilot's seat.

The turbocharger 10 is comprised of a compressor comprised of an air intake pipe 13, an impeller 14, and a compressor scroll chamber 15 and an exhaust turbine 20 comprised of a turbine scroll chamber 17, a turbine wheel 18, and an exhaust gas discharge pipe 19. The scroll chamber 15 of the compressor 16 is connected to the intake duct 9. On the other hand, the cylinders $3a$, $3b$, $3c$, and $3d$ are connected to a common exhaust manifold 21, while the remaining cylinders $3e$, $3f$, $3g$, and $3h$ are connected to a common exhaust manifold 22. These exhaust manifolds 21 and 22 are connected to a common exhaust pipe 23, which exhaust pipe 23 is connected to the scroll chamber 17 of the exhaust turbine 20. The turbine wheel 18 is made to turn by the exhaust gas discharged from the cylinders $3a$ to $3h$. By this, the impeller 14 is made to turn. When this happens, the air raised in pressure by the compressor 16 is fed to the cylinders $3a$ to $3h$ through the intake duct 9, the intercooler 8, the intake duct 6, and the corresponding intake branch pipes 5.

On the other hand, an exhaust bypass pipe 24 is branched from the exhaust pipe 23. This exhaust bypass pipe 24 is connected to the exhaust gas discharge pipe 19. In the exhaust bypass pipe 24 is arranged a waste gate valve 26 controlled by an actuator 25. When the opening of the waste gate valve 26 becomes larger, the amount of the exhaust gas fed to the turbine wheel 18 falls, so the rotational speed of the turbine wheel 18 falls and as a result the air pressure in the intake duct 9, that is, the supercharging pressure, falls. Therefore, by controlling the opening of the waste gate valve 26, it is possible to control the supercharging pressure.

As shown in FIG. 1, a pair of rotational speed sensors (hereinafter referred to as the NE sensors) $30a$ and $30b$ are attached to the engine body 1 to detect the engine rotational speed NE. Further, a pair of pressure sensors (hereinafter referred to as the PM sensors) $31a$ and $31b$ are attached inside the intake duct 6 downstream of the throttle valve to detect the pressure PM in the intake duct 6. Still further, a pair of pressure sensors (hereinafter referred to as the PD sensors) $32a$ and $32b$ are attached inside the intake duct 6 between the intercooler 8 and the throttle valve 11 so as to detect the deck pressure PD, that is, the supercharging pressure. Also, the throttle valve 11 has mounted in it a pair of opening sensors (hereinafter referred to as the TA sensors) 33a and 33b for detecting the opening TA of the throttle valve 11. A pair of water temperature sensors (hereinafter referred to as the TW sensors) 34a and 34b are attached to the engine body to detect the temperature TW of the engine coolant water.

Figure 2:
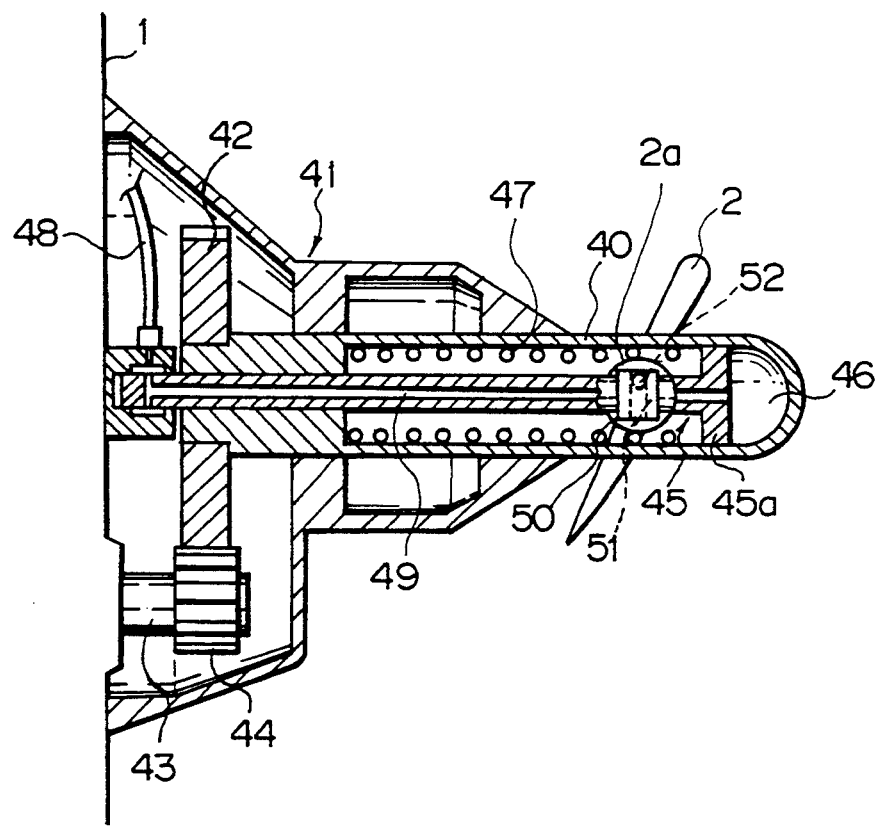
FIG. 2 is a side sectional view showing schematically the area around a propeller shaft.

As shown in FIG. 1, at the front of the engine body 1 there is attached a casing 41 which encloses the propeller shaft 40. FIG. 2 schematically shows the inside of the casing 41. Referring to FIG. 2, the propeller shaft 40 is rotatably supported in the casing 41. At the inside end of the propeller shaft 40 is affixed a large diameter gear 42. This large diameter gear 42 is engaged with a small diameter gear 44 affixed to a crankshaft 43 of the engine. Therefore, the crankshaft 43 is connected to the propeller shaft 40 through reduction gears comprised of the gears 42 and 44.

On the other hand, a piston 45 for controlling the propeller pitch is disposed in the propeller shaft 40. This piston 45 is disposed slidably in the axial direction inside the propeller shaft 4 and rotates with the propeller shaft 40. At the front end of the propeller shaft 40 there is formed an oil pressure chamber 46 defined by the expanded head 45a of the piston 45. In the propeller shaft 40 is inserted a compression spring 47 which biases the piston 6 toward the oil pressure chamber 46. Inside the oil pressure chamber 46 is supplied oil through an oil pressure conduit 48 and an oil pressure passage 49 in the piston 45. On the piston 45 is affixed a control rod 50 extending toward the root portion 2a of the propeller 2 in the direction perpendicular to the axial line of the piston 45. A groove 51 is formed in the front end face of the control rod 50. On the other hand, the root portion 2a of the propeller 2 is rotatably supported by the propeller shaft 40. At the root portion 2a of the propeller 2 is affixed a pin 52 which engages with the groove 51 at a position eccentric from the rotational axis of the root portion 2a. Therefore, if the piston 45 moves in the axial direction, the propeller 2 is rotated around the rotational axis of the propeller 2 and therefore the pitch of the propeller 2 is controlled by the piston 45. The amount of movement of the piston 2 is controlled by the amount of oil inside the oil pressure chamber 46. The amount of oil in the oil pressure chamber 46, on the other hand, is controlled by a propeller pitch control actuator 53 (FIG. 1).

Figure 3:
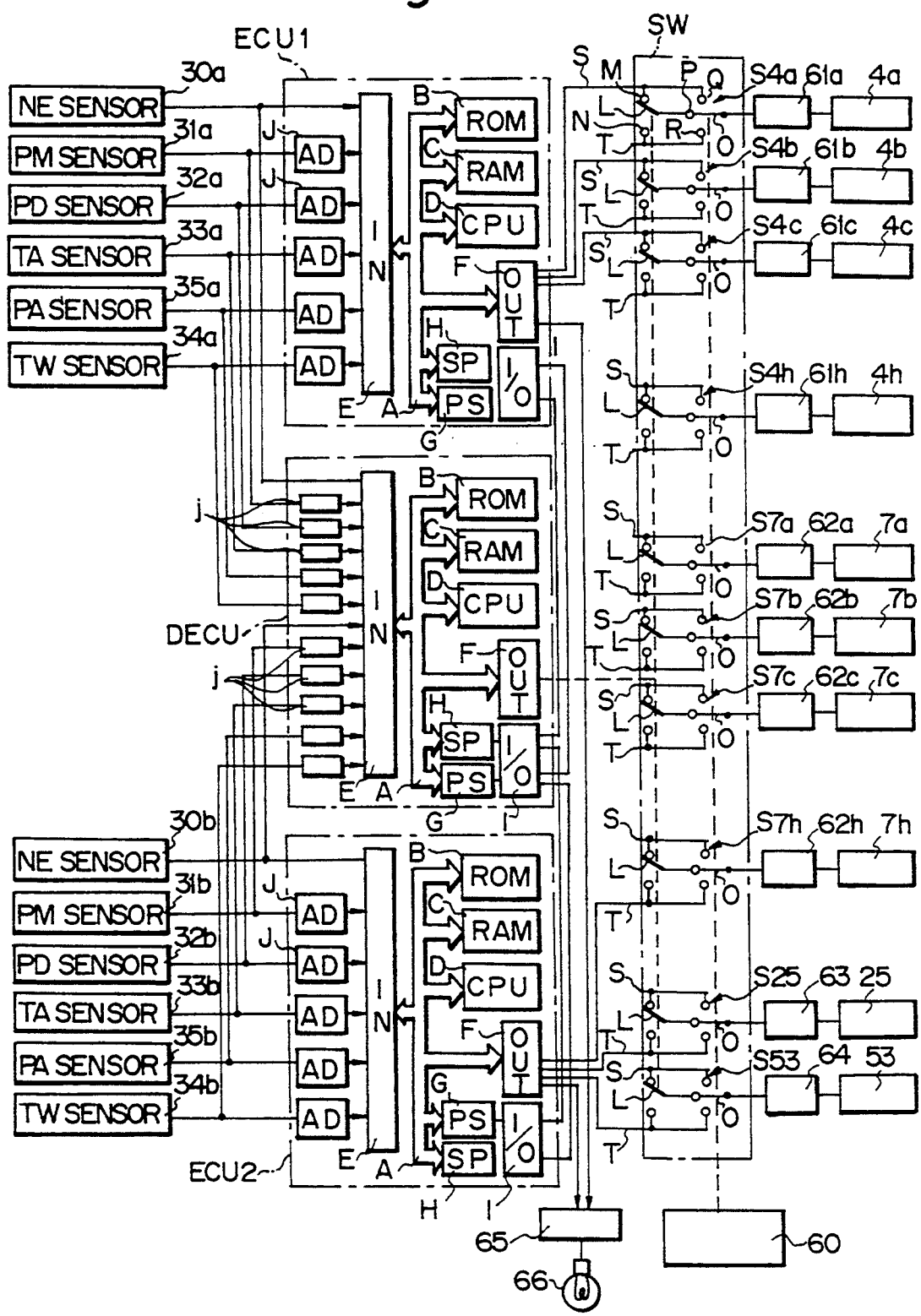
FIG. 3 is a view of an electronic control unit.

FIG. 3 shows an electronic control unit for controlling the fuel injectors 7a to 7h, the waste gate valve control actuator 25, and the propeller pitch control actuator 53.

Referring to FIG. 3, the electronic control unit has three digital computers, that is, a first operation use digital computer ECU1, a second operation use digital computer ECU2, and a fault diagnosis use digital computer DECU. The digital computers ECU1, ECU2, and DECU all have substantially the same construction and therefore an explanation will be made only of the construction of the digital computer ECU1.

As shown in FIG. 3, the digital computer ECU1 is provided with a read only memory (ROM) B, a random access memory (RAM) C, a microprocessor (CPU) D, an input port (IN) E, an output port (OUT) F, a parallel/series converter (PS) G, and a series/parallel converter (SP) H connected with each other by a bidirectional bus A. Further, the digital computer ECU1 is provided with an intercomputer communications input/output port (I/O) I connected to the parallel/series converter G and the series/parallel converter H and a plurality of AD converters (AD) J connected to the input port (IN) E. As will be understood from FIG. 3, the same construction is present in the other digital computers ECU2 and DECU.

The input/output (I/O) ports of the digital computers ECU1, ECU2, and DECU are provided for the transfer of data among the digital computers ECU1, ECU2, and DECU. In the embodiment shown in FIG. 3, data is transferred between the digital computer DECU and the digital computer ECU1 and between the digital computer DECU and the digital computer ECU2. This transfer of data is controlled by the digital computer DECU.

For example, when transferring data from the digital computer DECU to the digital computer ECU1, first, the data stored in the random access memory (RAM) of the digital computer DECU is converted to series data by the parallel/series converter (PS) G and sent from the input/output (I/O) port I of the digital computer DECU to the input/output port (I/O) I of the digital computer ECU1. In the digital computer ECU1, when the data is received, the series data is converted to parallel data by the series/parallel converter (SP), then this parallel data is stored in the random access memory (RAM) C.

As opposed to this, when transferring data from the digital computer ECU1 to the digital computer DECU, transfer command data is output to the input/output port (I/O) I of the digital computer DECU. When the digital computer ECU1 receives this transfer command data, the digital computer ECU1 converts the data stored in the random access memory (RAM) C to series data by the parallel/serial converter (PS) and sends it from the input/output port (I/O) I of the digital computer ECU1 to the input/output port (I/O) I of the digital computer DECU. When the digital computer DECU receives the data, it converts the series data to parallel data by the series/parallel converter (PS) H, then stores the parallel data in the random access memory (RAM) C. Note that data is transferred between the digital computer DECU and the digital computer ECU2 in a similar way.

The NE sensors 30a and 30b issue output pulses each time the engine crankshaft 43 turns a predetermined crank angle. The output pulses of the NE sensor 30a are input to the input port (IN) E of the digital computer ECU1 and the input port (IN) E of the digital computer DECU. The output pulses of the NE sensor 30b are input to the input port (IN) E of the digital computer ECU2 and the input port (IN) E of the digital computer DECU.

On the other hand, the PM sensors 31a and 31b issue output voltages proportional to the absolute pressure PM in the intake duct 6 downstream of the throttle valve 11, while the PD sensor 32a and 32b issue output voltages proportional to the absolute pressure (deck pressure) PD inside the intake duct 6 upstream of the throttle valve 11. Further, the TA sensors 33a and 33b issue output voltages proportional to the opening TA of the throttle valve 11, while the TW sensors 34a and 35a issue output voltages proportional to the engine coolant water temperature TW. Further, to detect the atmospheric pressure PA, a pair of atmospheric pressure sensors (hereinafter referred to as the PA sensors) 35a and 35b are provided. These PA sensors 35a and 35b issue output voltages proportional to the atmospheric pressure PA. The output voltages of the PM sensor 31a, the PD sensor 32a, the TA sensor 33a, the TW sensor 34a, and the PD sensor 35a are input to the input port (IN) E of the digital computer ECU1 and the input port (IN) E of the digital computer DECU through the corresponding AD converters (AD) J, while the output voltages of the PM sensor 31b, PD sensor 32b, TA sensor 33b, TW sensor 34b, and PA sensor 35b are input to the input port (IN) E of the digital computer ECU2 and the input port (IN) E of the digital computer DECU through the corresponding AD converters (AD) J.

The output ports (OUT) F of the digital computers ECU1 and ECU2 are connected to a switching circuit SW. In the switching circuit SW are provided switching means S4a to S4h, S7a to S7h, S25, and S53 of the same number as the number of the controlled objects like the spark plugs 4a to 4h and the fuel injectors 7a to 7h. These switching means S4a to S4h, S7a to S7h, S25, and S53 all have the same construction and therefore an explanation will only be made of the construction of the switching means S4a.

The switching means S4a is provided with a mechanically displayed electronic switch and a mechanical type switch. The electronic switch is comprised of a movable contact L and a pair of fixed contacts M and N, while the mechanical type switch is comprised of a movable contact 0 and three fixed contacts P, Q, and R. The fixed contact M of the electronic switch and the fixed contact Q of the mechanical type switch are connected to the first input line S, while the fixed contact N of the electronic switch and the fixed contact R of the mechanical type switch are connected to the second input line T. Further, the movable contact L of the electronic switch is connected to the fixed contact P of the mechanical type switch. As will be clear from FIG. 3, the other switching means S4b to S4h, S7a to S7h, S25, and S53 have the same construction.

The first input lines S of the switching means S4a to S4h, S7a to S7h, S25, and S53 are connected to the output port (OUT) F of the digital computer ECU1, while the second input lines T of the switching means S4a to S4h, S7a to S7h, S25, and S53 are connected to the output port (OUT) F of the digital computer ECU2. Further, the movable contacts L of the electronic switches of the switching means S4a to S4h, S7a to S7h, S25, and S53 are connected to the output port (OUT) F of the digital computer DECU. These movable contacts L are controlled simultaneously by the output signal of the digital computer DECU. Further, the movable contacts O of the mechanical type switches of the switching means S4a to S4h, S7a to S7h, S25, and S53 are connected to a manual switch 60. The movable contacts O are simultaneously controlled by the manual switch 60.

The movable contacts O of the mechanical type switches of the switching means S4a to S4h are connected to the spark plugs 4a to 4h of the cylinders through the corresponding ignitors 61a to 61h. Further, the movable contacts O of the mechanical type switches of the switching means S7a to S7h are connected to the fuel injectors 7a to 7h of the cylinders through the corresponding drive circuits 62a to 62h. Further, the movable contacts O of the mechanical type switches of the switching means S25 and S53 are connected to the waste gate valve control actuator 25 and the propeller pitch control actuator 53 through the corresponding drive circuits 63 and 64.

Usually, as shown in FIG. 3, the movable contacts O of the mechanical type switches of the switching means S4a to S4h, S7a to S7h, S25, and S53 are connected to the fixed contacts P, while the movable contacts L of the electronic switches of the switching means S4a to S4h, S7a to S7h, S25, and S53 are connected to the fixed contacts M. Therefore, at this time, the spark plugs 4a to 4h, the fuel injectors 7a to 7h, and the actuators 25 and 53 are controlled based on the output signals of the digital computer ECU1. On the other hand, when it is judged by the digital computer DECU that an abnormality occurs in the digital computer ECU1, the movable contacts L of the electronic switches of the switching means S4a to S4h, S7a to S7h, S25, and S53 are connected to the fixed contacts N. Therefore, at this time, the spark plugs 4a to 4h, the fuel injectors 7a to 7h, and the actuators 25 and 53 are controlled based on the output signals of the digital computer ECU2.

On the other hand, as shown in FIG. 3, the output port (OUT) F of the digital computer ECU1 is connected to an alarm circuit 65. The output port (OUT) F of the digital computer ECU2 is also connected to the alarm circuit 65. When it is judged by the digital computer ECU1 that an abnormality has occurred in the digital computer DECU, a DECU abnormality signal is sent to the alarm circuit 65, while when it is judged by the digital computer ECU2 that an abnormality has occurred in the digital computer DECU, an DECU abnormality signal is sent to the alarm circuit 65. When the alarm circuit 65 receives the DECU abnormality signal from both the digital computers ECU1 and ECU2, it judges that an abnormality has occurred in the digital computer DECU, The alarm circuit 65 informs the pilot that an abnormality has occurred in the digital computer DECU by lighting up an alarm lamp 66, for example.

If an abnormality occurs in the digital computer DECU, the switching action of the movable contact L of the electronic switch of the switching circuit SW becomes unstable and, for example, a situation occurs where the movable contacts L are repeatedly alternately connected to the fixed contacts M and N. It is difficult to conceive of a case where the three digital computers ECU1, ECU2, and DECU simultaneously suffer from an abnormality. Even if an abnormality occurs, it will occur in one of the same. Therefore, when an abnormality occurs in the digital computer DECU, the remaining digital computers ECU1 and ECU2 may be considered to be operating normally. Therefore, when the alarm lamp 66 is lit, the pilot operates the manual switch 60 and connects the mechanical type movable contacts O of the switching circuit SW to the fixed contacts Q or R. In this case, if the movable contacts O are connected to the fixed contacts Q, the spark plugs 4a to 4h, the fuel injectors 7a to 7h, and the actuators 25 and 53 are controlled based on the output signals of the digital computer ECU1. If the movable contacts O are connected to the fixed contacts R, the spark plugs 4a to 4h, the fuel injectors 7a to 7h, and the actuators 25 and 53 are controlled based on the output signal of the digital computer ECU2.

Next, an explanation will be made of the control method of the internal combustion engine etc. referring to FIG. 4 to FIG. 7B.

Figure 4:
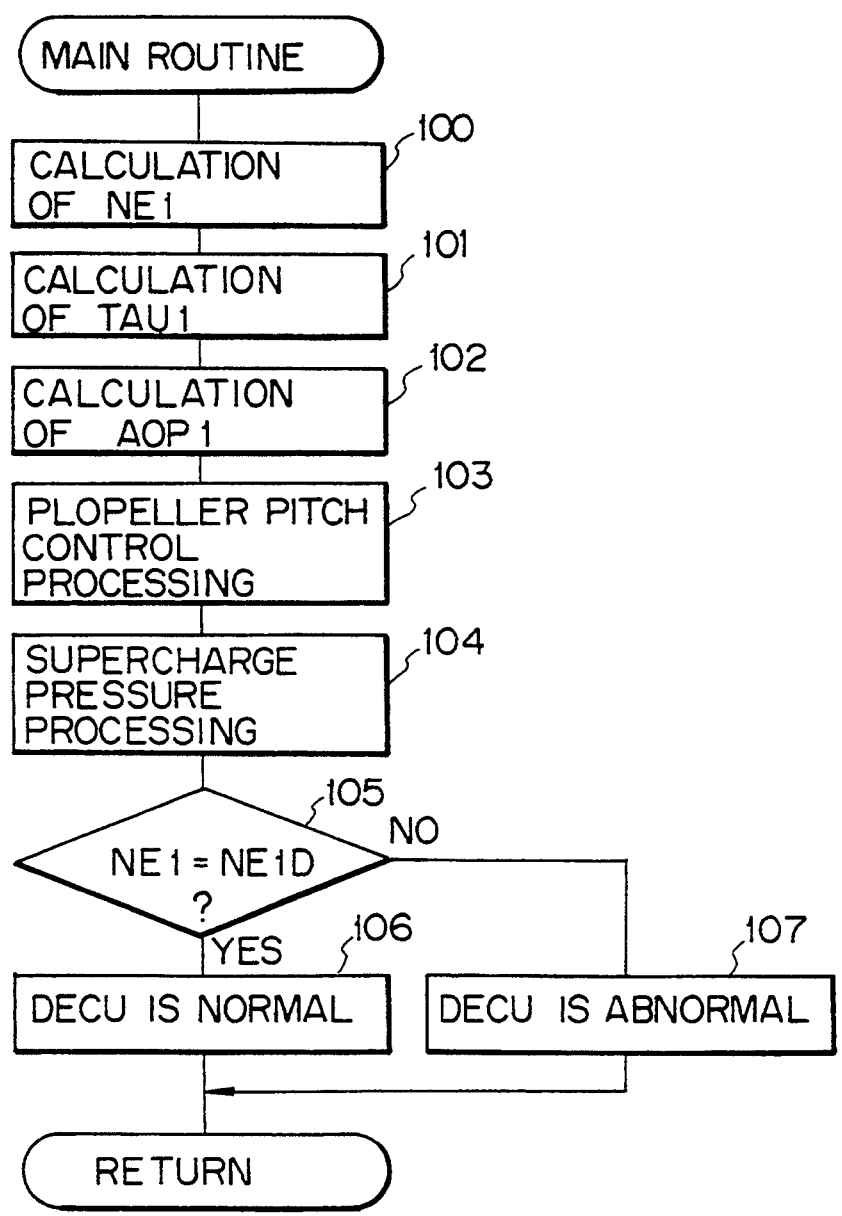
FIG. 4 is a flow chart of the routine executed in the digital computer ECU1.

FIG. 4 shows the main routine executed in the digital computer ECU1.

Figure 7A:
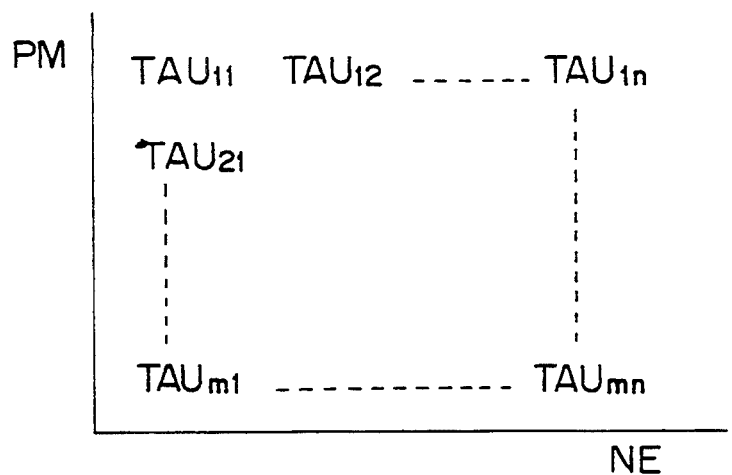
FIGS. 7A and 7B are views of the map of the fuel injection time TAU and the ignition timing AOP.

Referring to FIG. 4, first, at step 100, the engine rotational speed NE1 is calculated from the output pulses of the NE sensor 30a. Next, at step 101, the fuel injection time TAU1 is calculated from the absolute pressure PM detected by the PM sensor 31a and the engine rotational speed NE1. The fuel injection time TAU1 is stored in the read only memory (ROM) B of the digital computer ECU1 in advance in the form of a map, as shown in FIG. 7A, as a function of the absolute pressure PM and the engine rotational speed NE1. The fuel injection time TAU1 is corrected by the throttle opening TA detected by the TA sensor 33a, the engine coolant water temperature TW detected by the TW sensor 34a, and the atmospheric pressure PA detected by the PA sensor 35a.

Figure 7B:
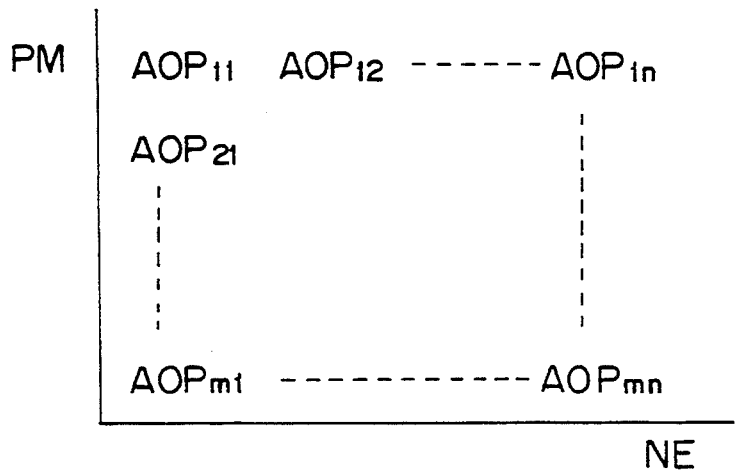

Next, at step 102, the ignition timing AOP1 is calculated from the absolute pressure PM detected by the PM sensor 31a and the engine rotational speed NE1. The ignition timing AOP1 is stored in the read only memory (ROM) B of the digital computer ECU1 in advance in the form of a map as shown by FIG. 7B as a function of the absolute pressure PM and the engine rotational speed NE1. The ignition timing AOP1 is corrected by the engine coolant water temperature TW detected by the TW sensor 34a.

Next, at step 103, the control data for the propeller pitch control actuator 53 is calculated based on the throttle valve opening TA detected by the TA sensor 33a and the engine rotational speed NE1 so that the engine rotational speed NE1 becomes the target rotational speed set in accordance with the throttle valve opening TA. Then, at step 104, the control data for the waist valve control actuator 25 is calculated based on the absolute pressure PM detected by the PM sensor 31a, the deck pressure PD detected by the PD sensor 32a, the throttle valve opening TA detected by the TA sensor 33a, the atmospheric pressure PA detected by the PA sensor 35a, and the engine rotational speed NE1 so that the deck pressure PD becomes the target deck pressure.

Next, at step 105, it is judged if the engine rotational speed NE1D calculated by the digital computer DECU based on the output pulses of the NE sensor 30a and transferred from the digital computer DECU to the digital computer ECU1 is equal to the engine rotational speed NE1 calculated by the digital computer ECU1. When NE1=NE1D, the routine proceeds to step 106, where it is judged that the digital computer DECU is operating normally. When NE1 and NE1D are not equal, the routine proceeds to step 107, where it is judged that there is a possibility of occurrence of abnormalities in the digital computer DECU. At this time, the DECU abnormality signal is sent to the alarm circuit 65. When at this time, the digital computer ECU2 also issues a DECU abnormality signal, as mentioned earlier, it is judged that the digital computer DECU has an abnormality, so the alarm lamp 66 is lit.

Note that as mentioned earlier, usually the spark plugs 4a to 4h, the fuel injectors 7a to 7h, and the actuators 25 and 53 are controlled based on the routine shown in FIG. 4, executed by the digital computer ECU1.

Figure 5:
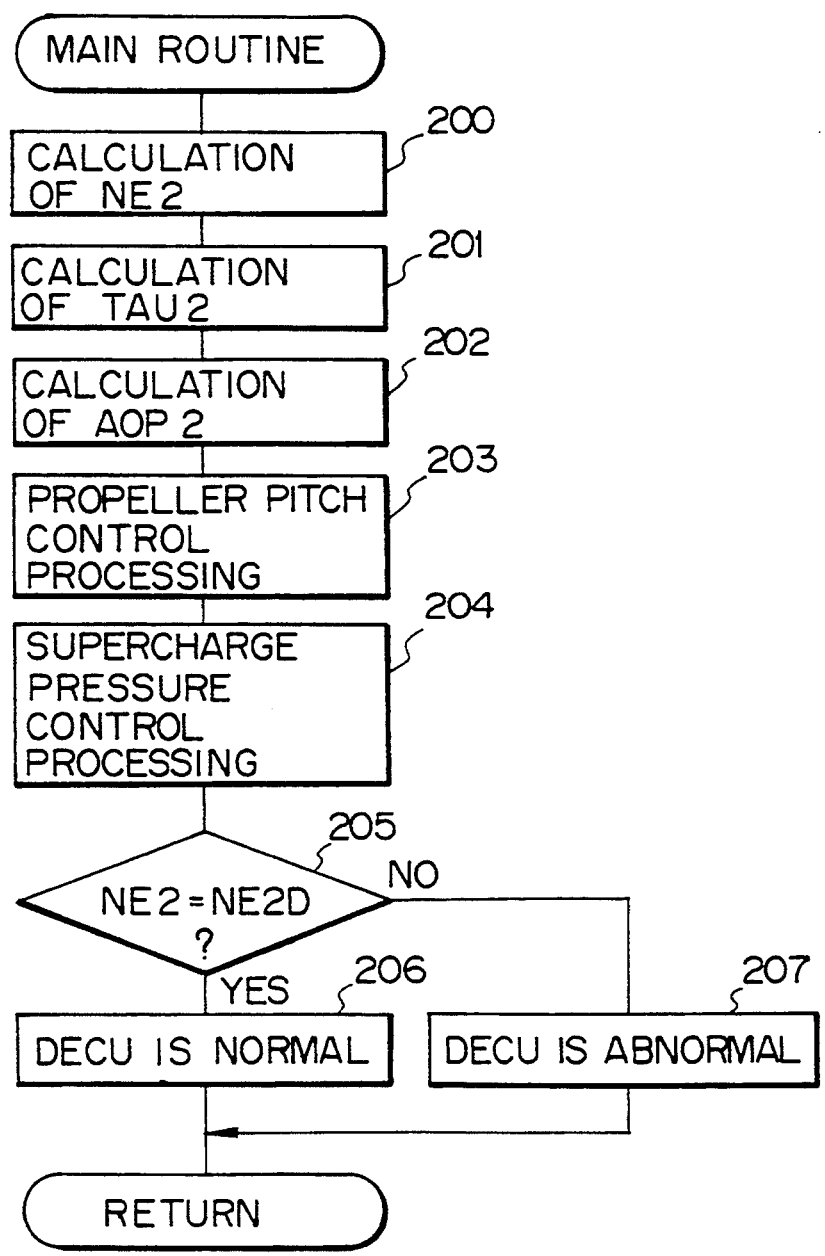
FIG. 5 is a flow chart of the routine executed in the digital computer ECU2.

FIG. 5 shows the main routine executed in the digital computer ECU2. This main routine is the same as the main routine executed in the digital computer ECU1 shown in FIG. 4 except for the use of the output signals of the NE sensor 30b, the PM sensor 31b, the PD sensor 32b, the TA sensor 33b, the TW sensor 34b, and the PA sensor 35b.

That is, referring to FIG. 5, first, at step 200, the engine rotational speed NE2 is calculated from the output pulses of the NE sensor 30b. Next, at step 201, the fuel injection time TAU2 is calculated from the absolute pressure PM detected by the PM sensor 31b and the engine rotational speed NE2. The fuel injection time TAU2 is stored in the read only memory (ROM) B of the digital computer ECU2 in advance in the form of a map, as shown in FIG. 7A, as a function of the absolute pressure PM and the engine rotational speed NE1. The fuel injection time TAU2 is corrected by the throttle opening TA detected by the TA sensor 33b, the engine coolant water temperature TW detected by the TW sensor 34b, and the atmospheric pressure PA detected by the PA sensor 35b.

Next, at step 202, the ignition timing AOP2 is calculated from the absolute pressure PM detected by the PM sensor 31b and the engine rotational speed NE2. The ignition timing AOP2 is stored in the read only memory (ROM) B of the digital computer ECU2 in advance in the form of a map as shown by FIG. 7B as a function of the absolute pressure PM and the engine rotational speed NE2. The ignition timing AOP2 is corrected by the engine coolant water temperature TW detected by the TW sensor 34b.

Next, at step 203, the control data for the propeller pitch control actuator 53 is calculated based on the throttle valve opening TA detected by the TA sensor 33b and the engine rotational speed NE2 so that the engine rotational speed NE2 becomes the target rotational speed set in accordance with the throttle valve opening TA. Then, at step 204, the control data for the waste valve control actuator 25 is calculated based on the absolute pressure PM detected by the PM sensor 31b, the deck pressure PD detected by the PD sensor 32b, the throttle valve opening TA detected by the TA sensor 33b, the atmospheric pressure PA detected by the PA sensor 35b, and the engine rotational speed NE2 so that the deck pressure PD becomes the target deck pressure.

Next, at step 205, it is judged if the engine rotational speed NE2D calculated by the digital computer DECU based on the output pulses of the NE sensor 30b and transferred from the digital computer DECU to the digital computer ECU2 is equal to the engine rotational speed NE2 calculated by the digital computer ECU2. When NE2=NE2D, the routine proceeds to step 206, where it is judged that the digital computer DECU is operating normally. When NE2 and NE2D are not equal, the routine proceeds to step 207, where it is judged that there is a possibility of occurrence of an abnormality in the digital computer DECU. At this time, the DECU abnormal signal is sent to the alarm circuit 65. When at this time, the digital computer ECU1 also issues a DECU abnormal signal, as mentioned earlier, it is judged that the digital computer DECU has an abnormality, so the alarm lamp 66 is lit.

Note that as mentioned earlier, usually the spark plugs 4a to 4h, the fuel injectors 7a to 7h, and the actuators 25 and 53 are controlled based on the routine shown in FIG. 4, executed by the digital computer ECU1. In this case too, however, the main routine shown in FIG. 5 continues to be executed.

Figure 6B:
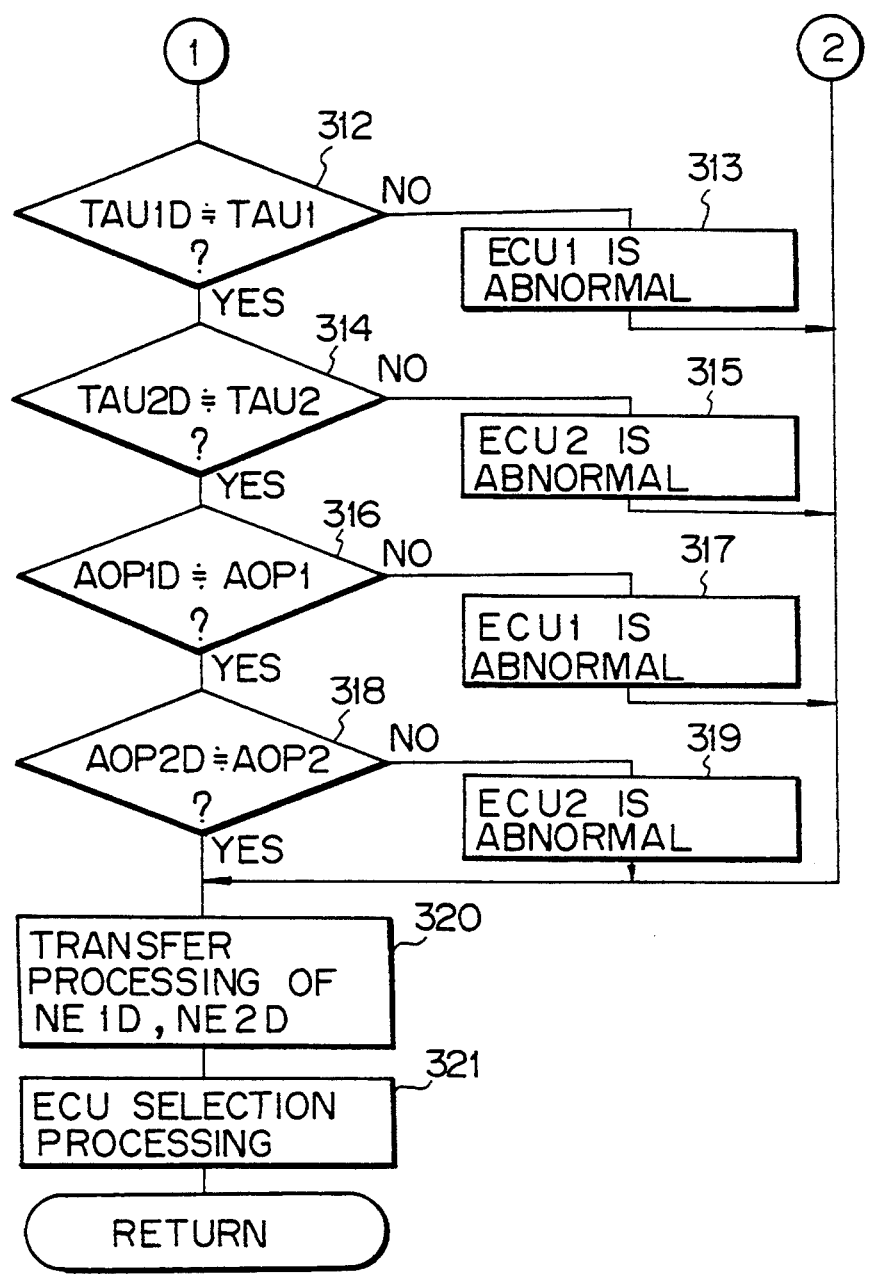

FIG. 6A and FIG. 6B show the main routine executed in the digital computer DECU.

Referring to FIG. 6A and FIG. 6B, first, at step 300, data transfer commands are sent to the digital computers ECU1 and ECU2, the engine rotational speed NE1, the fuel injection time TAU1, and the ignition timing AOP1 are received from the digital computer ECU1, the engine rotational speed NE2, the fuel injection time TAU2, and the ignition timing AOP2 are received from the digital computer ECU2, and the data is stored in the random access memory (RAM) C of the digital computer DECU. Next, at step 301, it is judged if the output pulses are received from the NE sensors 30a and 30b, whereby it is checked if the NE sensors 30a and 30b are operating normally.

Next, at step 302, the engine rotational speed NE1D is calculated from the output pulses of the NE sensor 30a. Next, at step 303, the fuel injection time TAU1D is calculated from the absolute pressure PM detected by the PM sensor 31a and the engine rotational speed NE1D. The fuel injection time TAU1D is stored in the read only memory (ROM) GB of the digital computer DECU in advance in the form of a map as shown in FIG. 7A as a function of the absolute pressure PM and the engine rotational speed NE1D. The fuel injection time TAU1D is corrected by the throttle valve opening TA detected by the TA sensor 33a, the engine coolant water temperature TW detected by the TW sensor 34a, and the atmospheric pressure PA detected by the PA sensor 35a.

Next, at step 304, the ignition timing AOP1D is calculated from the absolute pressure PM detected by the PM sensor 30a and the engine rotational speed NE1D. The ignition timing AOP1D is stored in the read only memory (ROM) B of the digital computer DECU in advance in the form of a map as shown in FIG. 7B as a function of the absolute pressure PM and the engine rotational speed NE1D. The ignition timing AOP1D is corrected by the engine coolant water temperature detected by the TW sensor 34a.

Next, at step 305, the engine rotational speed NE2D is calculated from the output pulse of the NE sensor 30b. Next, at step 306, the fuel injection time TAU2D is calculated from the absolute pressure PM detected by the PM sensor 31b and the engine rotational speed NE2D. The fuel injection time TAU2D is stored in the read only memory (ROM) B of the digital computer DECU in advance in the form of a map as shown in FIG. 7A as a function of the absolute pressure PM and the engine rotational speed NE2D. The fuel injection time TAU2D is corrected by the throttle valve opening TA detected by the TA sensor 33b, the engine coolant water temperature TW detected by the TW sensor 34b, and the atmospheric pressure PA detected by the PA sensor 35b.

Next, at step 307, the ignition timing AOP2D is calculated from the absolute pressure PM detected by the PM sensor 30b and the engine rotational speed NE2D. The ignition timing AOP2D is stored in the read only memory (ROM) B of the digital computer DECU in advance in the form of a map as shown in FIG. 7B as a function of the absolute pressure PM and the engine rotational speed NE2D. The ignition timing AOP2D is corrected by the engine coolant water temperature TW detected by the TW sensor 34b.

Next, at step 308, it is judged if the engine rotational speed NE1D calculated by the digital computer DECU based on the output pulses of the NE sensor 30a is equal to the engine rotational speed NE1 calculated by the digital computer ECU1 based on the output signals of the NE sensor 30a. When NE1D=NE1, it is judged that the digital computer ECU1 is operating normally and the routine proceeds to step 310. As opposed to this, when NE1D and NE1 are judged not equal, the routine proceeds to step 309, where it is judged that an abnormality occurs in the digital computer ECU1 and the routine jumps to step 320.

At step 310, it is judged if the engine rotational speed NE2D calculated by the digital computer DECU based on the output pulses of the NE sensor 30b is equal to the engine rotational speed NE2 calculated by the digital computer ECU2 based on the output signal of the NE sensor 30b. When NE2D=NE2, it is judged that the digital computer ECU2 is operating normally and the routine proceeds to step 312. When NE2D and NE2 are judged not equal, the routine proceeds to step 311, where it is judged that an abnormality has occurred in the digital computer ECU2, then the routine jumps to step 320.

At step 312, it is judged if the fuel injection time TAU1D calculated by the digital computer DECU based on the output signals of the PM sensor 31a etc. is substantially equal to the fuel injection time TAU1 calculated in the digital computer ECU1 based on the output signal of the PM sensor 31a etc. When TAU1D$\approx$TAU1, it is judged that the digital computer ECU1 is operating normally and the routine proceeds to step 314. As opposed to this, when it is judged that TAU1D and TAU1 are not substantially equal, the routine proceeds to step 313, wherein it is judged that an abnormality has occurred in the digital computer ECU1 and the routine jumps to step 320.

At step 314, it is judged if the fuel injection time TAU2D calculated by the digital computer DECU based on the output signals of the PM sensor 31b etc. is substantially equal to the fuel injection time TAU2 calculated in the digital computer ECU2 based on the output signal of the PM sensor 31b etc. When TAU2D$\approx$TAU2, it is judged that the digital computer ECU2 is operating normally and the routine proceeds to step 316. As opposed to this, when it is judged that TAU2D and TAU2 are not substantially equal, the routine proceeds to step 316, wherein it is judged that an abnormality has occurred in the digital computer ECU2 and the routine jumps to step 320.

At step 316, it is judged if the ignition timing AOP1D calculated by the digital computer DECU based on the output signals of the PM sensor 31a etc. is substantially equal to the ignition timing AOP1 calculated in the digital computer ECU1 based on the output signal of the PM sensor 31a etc. When AOP1D$\approx$AOP1, it is judged that the digital computer ECU1 is operating normally and the routine proceeds to step 318. As opposed to this, when it is judged that AOP1D and AOP1 are not substantially equal, the routine proceeds to step 317, wherein it is judged that an abnormality has occurred in the digital computer ECU1 and the routine jumps to step 320.

At step 318, it is judged if the ignition timing AOP2D calculated by the digital computer DECU based on the output signals of the PM sensor 31b etc. is substantially equal to the ignition timing AOP2 calculated in the digital computer ECU2 based on the output signal of the PM sensor 31b etc. When AOP2D$\approx$AOP2, it is judged that the digital computer ECU2 is operating normally and the routine proceeds to step 320. As opposed to this, when it is judged that AOP2D and AOP2 are not substantially equal, the routine proceeds to step 320, wherein it is judged that an abnormality has occurred in the digital computer ECU2 and the routine jumps to step 320.

At step 320, the engine rotational speed NE1D calculated in the digital computer DECU is transferred to the digital computer ECU1, and the engine rotational speed NE2D calculated in the digital computer ECU is transferred to the digital computer ECU2. Next, at step 321, it is judged which of the digital computers ECU1 and ECU2 is used for the control. That is, as mentioned earlier, usually, the digital computer ECU1 is used for the control. When an abnormality occurs in the digital computer ECU1, control by the digital computer ECU2 is switched to. Further, after this, if the digital computer ECU1 operates normally and in that state an abnormality occurs in the digital computer ECU2, control by the digital computer ECU1 is switched to.

As shown in FIG. 3, in the embodiment according to the present invention, the spark plugs 4a to 4h are provided with the ignitors 61a to 61h and the switching means S4a to S4h independently for each cylinder. The fuel injectors 7a to 7h are provided with the drive circuits 62a to 62h and the switching means S7a to S7h for each cylinder. That is, the controlled systems controlled by one of the digital computers ECU1 and ECU2, that is, for the ignition system, the controlled system comprised of the switching means S4a to S4h, the ignitors 61a to 61h, and the spark plugs 4a to 4h, and, for the fuel injection system, the controlled system comprised of the switching means S7a to S7h, the drive circuits 62a to 62h, and the fuel injectors 7a to 7h, are provided independently for each cylinder. In other words, the systems controlled by the digital computers ECU1 and ECU2 are provided in multiple. If the controlled systems are provided in multiple in this way, even if an abnormality occurs in one controlled system, the remaining seven controlled systems can continue operating normally. In an 8-cylinder internal combustion engine such as shown in FIG. 1, even if one cylinder no longer operates normally, the engine continues operating with just a decline in the engine output. Therefore, even if an abnormality occurs in a controlled system, the engine can continue operating.

In particular, in internal combustion engines for aircraft, provision of multiple electrical systems is demanded so as to enable continuous operation of the engine by another electrical system in the event an electrical system malfunctions. In this case, the construction of the internal combustion engine and the control apparatus becomes extremely complicated if one merely provides multiple electrical systems and for example provides two spark plugs for each cylinder, provides two fuel injectors, normally uses one of the spark plugs and one of the fuel injectors, and, when these malfunction, uses the other spark plug and other fuel injector. In the present invention, however, even when the controlled systems are provided in multiple, when one of the controlled systems malfunctions, it is possible to continuously run the engine. Further, if the controlled systems are provided in multiple, it is sufficient to provide a single spark plug and a single fuel injector for each cylinder, so it is possible to streamline the construction of the internal combustion engine and the control apparatus. Therefore, when providing multiple systems, it is preferable to provide multiple controlled systems rather than multiple electrical systems.

According to the present invention, it is possible to run an internal combustion engine provided with systems controlled by the output of digital computers continuously even if an abnormality occurs in one of the digital computers or one of the controlled systems.

While the invention has been described by reference to specific embodiments chose for purposes of illustration, it should be apparent that numerous modifications could be made thereto by those skilled in the art without departing from the basic concept and scope of the invention.

We claim:

1. A device for controlling an engine having a plurality of cylinders, said device comprising:
    first, second and third digital computers;
    a plurality of controlled systems each being independently provided for a corresponding cylinder, each control system being controlled by the output of one of the first and second digital computers and controlling the corresponding cylinders; and
    a plurality of switching means each being provided for a corresponding controlled system, each switching means being controlled by the third digital computer to selectively input the output of one of said first and second digital computers into each controlled system to control the corresponding cylinder.

2. A device according to claim 1, wherein said controlled systems are ignition systems.

3. A device according to claim 2, wherein each of said ignition systems comprises a single spark plug.

4. A device according to claim 1, wherein said controlled systems are injection systems.

5. A device according to claim 4, wherein each of said ignition systems comprises a single fuel injector.

6. A device according to claim 1, wherein said switching means normally inputs the output of a predetermined one of said digital computers into each controlled system.

7. A device according to claim 6, further comprising determining means for determining whether the operation of said first and second digital computers is normal, wherein the third digital computer controls said switching means to switch the control of the controlled systems from the output of the one of said first and second digital computers which is currently controlling the controlled systems to the other of said first and second digital computer when said determining means determines that the operation of the currently controlling digital computer is abnormal.

8. A device according to claim 1, wherein said third digital computer comprises determining means for determining whether the operations of said first digital computer and said second digital computer are normal, and wherein said third digital computer controls the plurality of switching means to switch the control of the controlled systems from the output of said first digital computer to the output of said second digital computer when the determining means determines that the operation of said first digital computer is abnormal and the operation of said second digital computer is normal, and to switch the control of the controlled systems from the output of said second digital computer to the output of said first digital computer when the determining means determines that the operation of said second digital computer is abnormal and the operation of said first digital computer is normal.

9. A device for use in an engine according to claim 8, further comprising a first engine speed detecting means and a second engine speed detecting means for detecting an engine speed, said first digital computer calculating a first engine speed on the basis of an output of said first engine speed detecting means, said second digital computer calculating a second engine speed on the basis of an output of said second engine speed detecting means, said third digital computer calculating a third engine speed and a fourth engine speed on the basis of the outputs of said first engine speed detecting means and said second engine speed detecting means, respectively, said determining means determining that the operation of said first digital computer is abnormal when said first engine speed is different from said third engine speed, said determining means determining that the operation of said second digital computer is abnormal when said second engine speed is different from said fourth engine speed.

10. A device according to claim 9, further comprising a first pressure detecting means and a second pressure detecting means for detecting pressure in an intake passage of the engine, said first digital computer calculating a first injection time on the basis of outputs of said first engine speed detecting means and said first pressure detecting means, said second digital computer calculating a second injection time on the basis of outputs of said second engine speed detecting means and said second pressure detecting means, said third digital computer calculating a third injection time on the basis of outputs of said first engine speed detecting means and said first pressure detecting means, said third digital computer calculating a fourth injection time on the basis of outputs of said second engine speed detecting means and said second pressure detecting means, said determining means determining that the operation of said first digital computer is abnormal when said first injection time is not approximately equal to said third injection time, said determining means determining that the operation of said second digital computer is abnormal when said second injection time is not approximately equal to said fourth injection time.

11. A device according to claim 9, further comprising a first pressure detecting means and a second pressure detecting means for detecting pressure in an intake passage of the engine, said first digital computer calculating a first ignition time on the basis of outputs of said first engine speed detecting means and said first pressure detecting means, said second digital computer calculating a second ignition time on the basis of outputs of said second engine speed detecting means and said second pressure detecting means, said third digital computer calculating a third ignition time on the basis of outputs of said first engine speed detecting means and said first pressure detecting means, said third digital computer calculating a fourth ignition time on the basis of outputs of said second engine speed detecting means and said second pressure detecting means, said determining means determining that the operation of said first digital computer is abnormal when said first ignition time is not approximately equal to said third ignition time, said determining means determining that the operation of said second digital computer is abnormal when said second ignition time is not approximately equal to said fourth ignition time.

12. A device according to claim 1, wherein said first digital computer comprises a first determining means for determining whether or not the operation of said third digital computer is normal, and said second digital computer comprises a second determining means for determining whether or not the operation of said third digital computer is normal.

13. A device according to claim 12, further comprising indicating means indicating that both said first determining means and said second determining means determine that the operation of said third digital computer is abnormal, each switching means comprising a first switch controlled by said third digital computer and a second switch which can be manually controlled in accordance with an indication by said indicating means so as to input the output of one of said first digital computer and said second digital computer into each controlled system.

14. A device for use in an engine according to claim 12, further comprising a first engine speed detecting means and a second engine speed detecting means for detecting an engine speed, said first digital computer calculating a first engine speed on the basis of an output of said first engine speed detecting means, said second digital computer calculating a second engine speed on the basis of an output of said second engine speed detecting means, said third digital computer calculating a third engine speed and a fourth engine speed on the basis of the outputs of said first engine speed detecting means and said second engine speed detecting means, respectively, said first determining means determining that the operation of said third digital computer is abnormal when said first engine speed is different from said third engine speed, said second determining means determining that the operation of said third digital computer is abnormal when said second engine speed is different from said fourth engine speed.

* * * * *